United States Patent [19]

Tabushi et al.

[11] 4,169,079

[45] Sep. 25, 1979

[54] POLYSTYRENE BASED POLYMERS CONTAINING CYCLODEXTRIN DERIVATIVES, METAL COMPLEXES OF THE SAME, AND PROCESS FOR THE PRODUCTION OF THE SAME

[75] Inventors: Iwao Tabushi, No. 24-1, Matsugasaki-Higashisakuragi-cho, Sakyo-ku, Kyoto-shi, Kyoto-fu, Japan; Nobuaki Shimizu, Sodegaura, Japan; Kazuo Yamamura, Kyoto, Japan

[73] Assignee: Iwao Tabushi, Kyoto, Japan

[21] Appl. No.: 899,532

[22] Filed: Apr. 24, 1978

[30] Foreign Application Priority Data

Oct. 24, 1977 [JP] Japan .............................. 52-126738
Oct. 24, 1977 [JP] Japan .............................. 52-126739
Oct. 24, 1977 [JP] Japan .............................. 52-126740
Oct. 24, 1977 [JP] Japan .............................. 52-126741

[51] Int. Cl.² ............................. C08L 5/16; C08F 8/00
[52] U.S. Cl. ............................. 260/17.4 UC; 210/24; 210/37 B; 260/17.4 ST; 252/426; 252/431 N
[58] Field of Search ................. 260/17.4 SG, 17.4 UC

[56] References Cited

U.S. PATENT DOCUMENTS

| | | | |
|---|---|---|---|
| 3,826,767 | 7/1974 | Hoover et al. | 260/17.4 GC |
| 4,032,488 | 6/1977 | Hokkoku et al. | 260/17.4 GC |
| 4,042,538 | 8/1977 | Lucas | 260/17.4 SG |

OTHER PUBLICATIONS

Horn et al., "Solid Phase Edman Degradation: Attachment of Carboxyl-Terminal Homoserine Peptides to an Insoluble Resin" Chem. Abst. 80, 48374d (1974).

*Primary Examiner*—Earl A. Nielsen
*Attorney, Agent, or Firm*—Frishauf, Holtz, Goodman & Woodward

[57] ABSTRACT

A cyclodextrin derivative-containing a polystyrene based polymer containing units of structure having the formula:

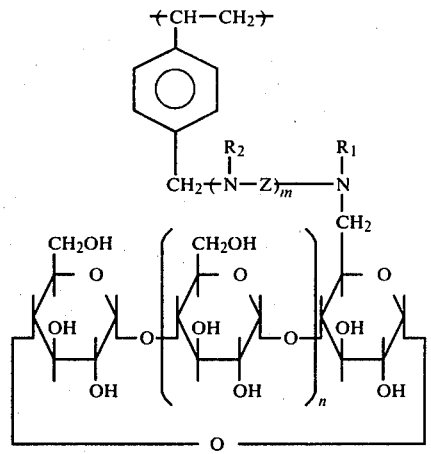

(wherein m is an integer of 1 to 10; n is 4, 5 or 6; $R_1$ and $R_2$ are hydrogen or alkyl groups containing 1 to 3 carbon atoms; and Z is an alkylene group containing 1 to 5 carbon atoms); a metal complex of the polystyrene based polymer; and a process for the production of the polystyrene based polymer or metal complex thereof.

20 Claims, 1 Drawing Figure

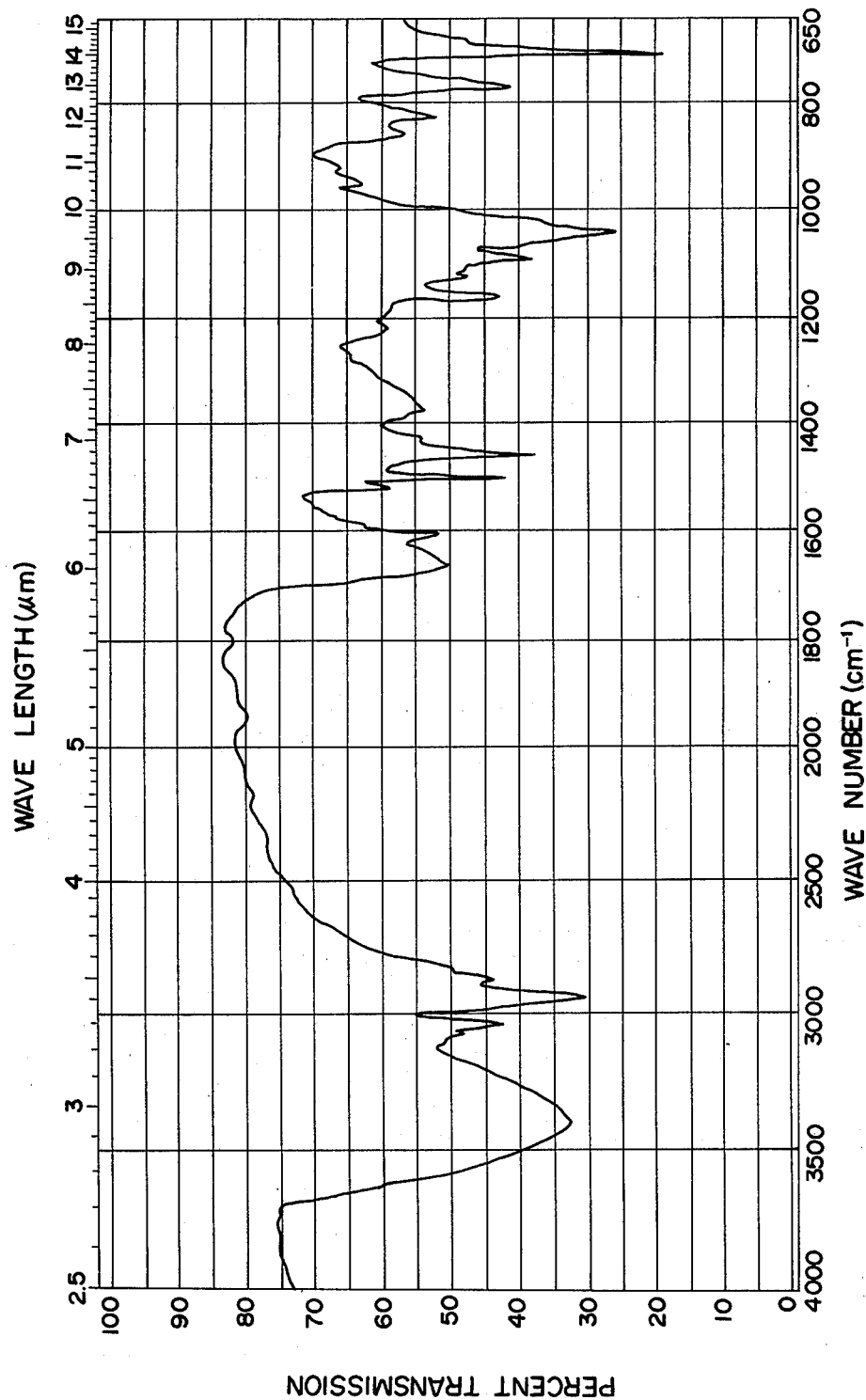

POLYSTYRENE BASED POLYMERS CONTAINING CYCLODEXTRIN DERIVATIVES, METAL COMPLEXES OF THE SAME, AND PROCESS FOR THE PRODUCTION OF THE SAME

BACKGROUND OF THE INVENTION

1. Field of the Invention

This invention relates to novel polystyrene based polymers containing specific cyclodextrin derivatives, their metal complexes, and a process for producing the polystyrene based polymers. More particularly, it is concerned with novel polystyrene based polymers wherein polyalkylenenpolyamine derivatives of cyclodextrin are introduced to polystyrene at the para-position of certain benzene rings thereof, their metal complexes, and processes for efficiently producing such polystyrene based polymers.

2. Description of the Prior Art

It has hitherto been known that cyclodextrin forms inclusion complexes with many organic compounds, and thus utilizing such properties, cyclodextrin is used to separate organic compounds, or to solubilize slightly soluble organic compounds, such as medicines in an aqueous medium, or to stabilize organic compounds, such as medicines. The inclusion ability and dissolving power of cyclodextrin into water, however, are not sufficient and thus are not practical. Recently, various attempts have been made to improve such inclusion ability, etc., by modification of cyclodextrin, for example, carboxymethylation, esterification using sulfuric acid, etc. However, no modified cyclodextrins having sufficient inclusion ability and dissolving power have been obtained.

We have already discovered that cyclodextrin derivatives containing polyalkylenepolyamino groups and their metal complexes have sufficient inclusion and dissolving abilities. (See Japanese Patent application Nos. 17727/1977 and 17728/1977, now published unexamined patent applications (Kokai tokkyo koho) Nos. 102985/1978 and 102986/1978.) However, since these derivatives and their inclusion complexes are very water-soluble, they are not suitable for use in removal of organic compounds from solutions although they have great capturing ability and selectivity.

SUMMARY OF THE INVENTION

As a result of our investigations to provide materials which permit easy separation, removal, and recovery of organic compounds dissolved in a water medium, by rendering the above described cyclodextrin derivatives swelled but insoluble in water, it has been found that polystyrene based polymers having the structure of the above described dextrin derivatives introduced into a main chain of polystyrene have great inclusion ability and furthermore are insoluble in water.

Thus this invention provides a polystyrene based polymer containing units of structure having the formula:

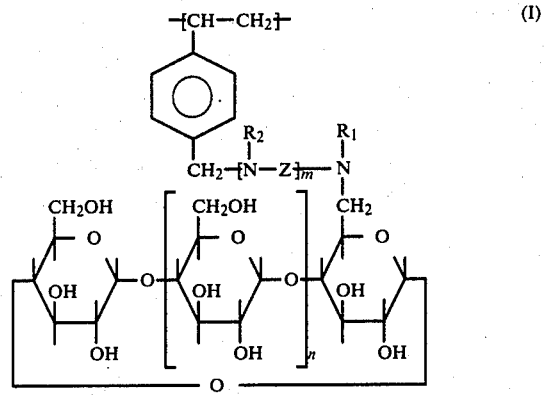

wherein m is an integer of from 1 to 10; n is 4, 5 or 6; $R_1$ and $R_2$ are hydrogen or alkyl groups containing 1 to 3 carbon atoms; and Z is an alkylene group containing 1 to 5 carbon atoms.

In addition, this invention provides a metal complex of the polystyrene based polymer, and a process for producing the polystyrene based polymer.

BRIEF DESCRIPTION OF THE DRAWINGS

The FIGURE illustrates an infrared absorption spectrum of polystyrene containing 6-deoxy-6-(α-triethylenetetraamino)-β-cyclodextrin obtained in Example 1.

DETAILED DESCRIPTION OF THE INVENTION

Although the polystyrene based polymers of this invention represented by Formula (I) can be produced by various procedures, the following two preferred procedures will be explained in detail.

One of the procedures is to react cyclodextrin derivatives represented by the formula:

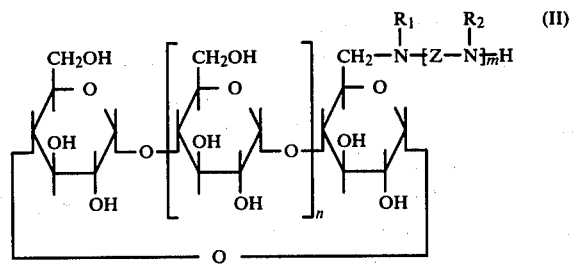

(m, n, $R_1$, $R_2$ and Z are the same as defined in Formula (I)) with a polystyrene based polymer containing a unit of structure having the formula:

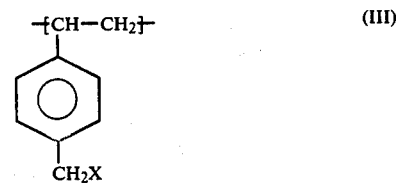

(wherein X is a halogen atom). Hereinafter, this procedure is referred to as Procedure A.

The cyclodextrin derivatives of Formula (II) used as starting materials in Procedure A can be produced by various procedures. For example, they can be efficiently produced by the following procedure.

First, α-, β- or γ-cyclodextrin is reacted with an aromatic sulfonyl halide to form a sulfonic acid ester of cyclodextrin represented by the formula:

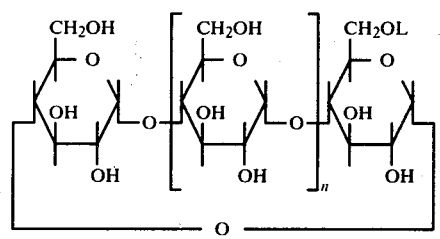
(IV)

(wherein n is the same as defined above; and L is an aromatic sulfonyl group.)

Aromatic sulfonyl halides as herein used include p-toluenesulfonyl chloride, mesitylenesulfonyl chloride, α-naphthalenesulfonyl chloride, p-bromobenzenesulfonyl chloride and the like.

The reaction of cyclodextrin with aromatic sulfonyl halide is well known and can be carried out under conventionally employed conditions. For example, in accordance with one preferred embodiment, cyclodextrin and at least an equimolar amount of an aromatic sulfonyl halide are dissolved in a solvent such as pyridine, dimethylformamide, dimethylsulfoxide, monoglyme, etc. and reacted at a temperature of from 0° C. to 50° C. for 10 minutes to 12 hours in the presence of organic or inorganic bases such as pyridine, triethylamine, dimethylamine, sodium hydroxide, potassium carbonate, etc. After the reaction is completed, the solvent is removed and the residue is recrystallized from water to provide the desired product, i.e., cyclodextrin sulfonate represented by Formula (IV).

Typical examples of the cyclodextrin sulfonates are, for example, 6-0-(p-toluenesulfonyl)-β-cyclodextrin represented by the formula:

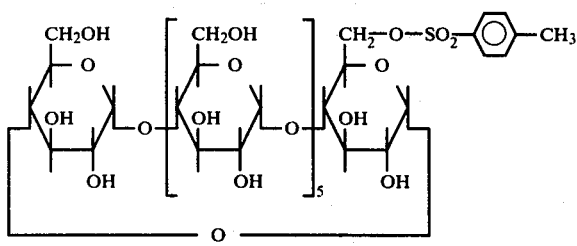

and 6-0-(mesitylenesulfonyl)-β-cyclodextrin represented by the formula:

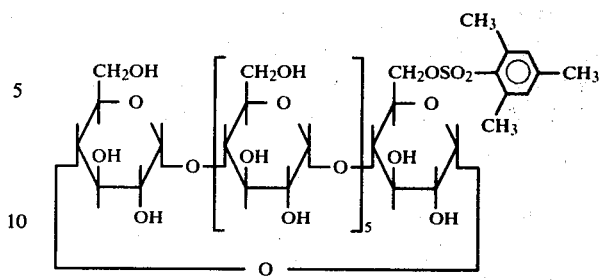

Next, the above cyclodextrin sulfonate and polyalkylenepolyamine represented by the formula:

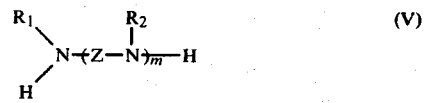
(V)

(wherein m, $R_1$, $R_2$ and Z are the same as defined above) are reacted to form the cyclodextrin derivative represented by Formula (II).

The polyalkylenepolyamine of Formula (V) used in this reaction are, as can be seen from the formula, those containing at least two nitrogen atoms with an alkylene group (Z) containing 1 to 5 carbon atoms such as methylene, ethylene, trimethylene or others interposed there between. Although polyalkylenepolyamines containing not less than 12 nitrogen atoms can be used in the reaction, only limited increase in effect is obtained. In addition, those containing a small number of nitrogen atoms can be easily synthesized and are cheap.

Typical examples of these polyalkylenepolyamines are diethylenetriamine, triethylenetetramine, tetraethylenepentaamine, N,N'-bis(3(2-aminoethylamino)propyl)ethylenediamine, N,N'-bis(2-aminoethyl)-1,3-propanediamine, N,N'-bis(3-aminopropyl)-1,3-propanediamine, 3,3'-diaminodipropylamine, etc.

In accordance with one preferred embodiment of the above reaction of cyclodextrin sulfonate with polyalkylenepolyamine represented by Formula (V), cyclodextrin sulfonate and at least an equimolar amount of polyalkylenepolyamine are dissolved in a solvent such as dimethylformamide, dimethylsulfoxide, pyridine, ethyleneglycol, propyleneglycol or others and reacted at between room temperature (20° C.) and 80° C. for between 5 minutes to 24 hours. This reaction can proceed in the absence of a solvent, if the starting material polyalkylenepolyamine is used in sufficient excess with respect to cyclodextrin sulfonate.

Pure cyclodextrin sulfonate is not always employed and cyclodextrin sulfonate contaminated by moderate amounts of cyclodextrin can be used as a starting material. So, it is possible to carry out the continuous process wherein cyclodextrin is employed as a starting material and reacted with sulfonyl halide, and the resulting product is then reacted with polyalkylenepolyamine without further purification.

The above described procedures provide the cyclodextrin represented by Formula (II) wherein at least two nitrogen atoms are contained and an alkylene group containing 1 to 5 carbon atoms such as methylene, ethylene, trimethylene, etc. is interposed between the nitrogen atoms.

Typical examples of the cyclodextrin derivatives represented by Formula (II) are, for example, 6-deoxy- 6-(α-diethylenetriamino)-β-cyclodextrin represented by the formula:

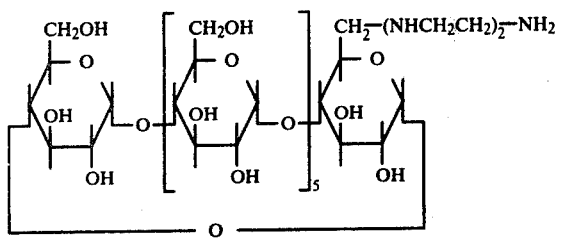

and 6-deoxy-6-(α-triethylenetetraamino)-β-cyclodextrin represented by the formula:

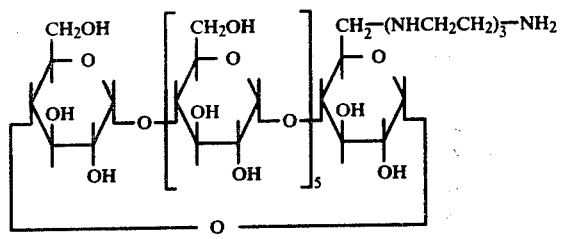

The polystyrene based polymer containing a unit of structure having Formula (III), which is the other starting material used in Procedure A, will hereinafter be explained.

Polystyrene based polymers usually used in this procedure are polystyrene, ABS (acrylonitrile-butadiene-styrene copolymer), and the like. In addition, styrene-divinylbenzene copolymers can be used. The final product is used in the form of film or beads. The degree of polymerization of these polymers is not especially limited and can be approximately selected according to the purpose.

The halomethyl group (—CH$_2$X) contained in the polystyrene based polymer is preferably 1 to 8 per 10 of the benzene rings of the polystyrene, particularly 2 to 5. Introduction of the halomethyl group into the main chain of the polystyrene based polymer, especially the para-position of the benzene ring of the styrene unit

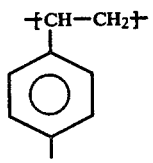

can be done effectively by procedures well known in this field. For example, the following halomethylation procedures are the most simple and effective: a process for commercial production of ion exchange resins with chloromethyl methyl ether-zinc chloride can be employed for chloromethylation of polystyrene, and for bromomethylation of polystyrene, the same process can be employed with the exception that bromomethyl methyl ether is used in place of chloromethyl methyl ether.

In accordance with Procedure A, as described above, a cyclodextrin derivative of Formula (II) is reacted with a polystyrene based polymer containing units of structure having Formula (III). The conditions of this reaction are not especially limited. In general, however, the polystyrene based polymer containing a unit of constitution having Formula (III) is first dissolved or swelled in an amide-based solvent such as N,N-dimethylformamide, N,N-dimethylacetamide or others, or solvents capable of dissolving or swelling the polystyrene based polymer. While stirring, the cyclodextrin derivative having Formula (II) dissolved in the same solvent as used above in at least an equimolar amount is then added to the halomethyl group contained in the polystyrene based polymer. While the concentration of the polystyrene based polymer and cyclodextrin derivative in this reaction system are not especially limited, they are usually between 1 and 20% by weight. The temperature at which the reaction is carried out can be approximately selected within the range of room temperature to 100° C., and the reaction period is preferably about 3 to 7 days. While it is not always needed to add dehydrohalogenation agents to the reaction system, dehydrohalogenation agents such as trimethylamine and the like can be added.

After the above reaction is completed, water is added to the reaction mixture or its concentrate. The solid portion precipitated is separated by filtration, etc. Then the separated solids are washed with water or hot water, treated with dilute alkali such as caustic soda, caustic potash, etc., then washed with water and separated, and finally dried. Thus the solids of the polystyrene based polymers containing a unit of structure having Formula (I), i.e., polystyrene based polymers containing cyclodextrin derivatives can be obtained.

Hereinafter, the other preferred procedure to produce the polystyrene based polymers of this invention will be explained. According to this procedure, cyclodextrin sulfonate represented by Formula (IV) and a polystyrene based polymer containing units of structure having the formula:

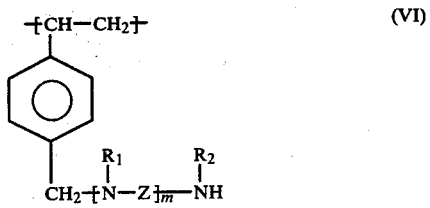

(wherein m, R$_1$ and R$_2$ are the same as defined above) are reacted. Hereinafter, this procedure is referred to as Procedure B.

The kind, production conditions, etc., of the cyclodextrin sulfonate of Formula (IV) used as a starting material in Procedure B are as described above. Therefore, the other starting material used in Procedure B, i.e., polystyrene based polymer containing units of structure having Formula (VI) will hereinafter be explained.

These polystyrene based polymers containing polyalkylenepolyamino groups are commercially available and can be used in this reaction as they are. As a matter of course, they can be synthesized independently and used in this reaction. In the first place, the halomethyl group (—CH$_2$X) is introduced to the polystyrene unit

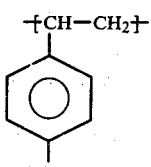

at the para-position of the benzene ring to form alomethylated polystyrene containing a unit of structure having Formula (III). Then the halomethylated polystyrene is reacted with polyalkylenepolyamine represented by Formula (V) whereby the polystyrene based polymer containing units of structure having Formula (VI), i.e., polystyrene based polymer with polyalkylenepolyamine introduced thereto, can be obtained. The kind, halomethylation, etc., of the polystyrene based polymer used in the above reaction are as described in Procedure A.

The reaction conditions of the above halomethylated polystyrene with the polyalkylenepolyamine having Formula (V) are not especially limited. Usually the halomethylated polystyrene is first dissolved or swelled in a solvent such as, N,N-dimethylformamide, methylene chloride and the like. To this system is then added polyalkylenepolyamine in at least an equimolar amount to the halomethyl group of the system, and the resulting mixture is reacted between from room temperature to 100° C. for between 30 minutes to 20 hours. The polyalkylenepolyamines used in this reaction are as described in Procedure A.

In Procedure B, the cyclodextrin sulfonate represented by Formula (IV) reacts with the polystyrene based polymer containing a unit of structure having Formula (VI). The reaction conditions are not especially limited. In general, however, the polystyrene based polymer containing a unit of structure having Formula (VI) is first dissolved or swelled in an amide solvent such as N,N-dimethylformamide, N,N-dimethylacetamide or other solvents capable of dissolving or swelling the polystyrene based polymer. To this system is then added the cyclodextrin sulfonate having Formula (IV) dissolved in the same solvent as used above in at least an equimolar amount to the polyalkylenepolyamine group contained in the polystyrene based polymer. The resulting mixture is stirred. Although the concentrations of the polystyrene based polymer and cyclodextrin sulfonate in this reaction system are not especially limited, they are usually between 1 and 20% by weight. The reaction temperature can be approximately selected within the range of from room temperature to 100° C., and the reaction period is preferably about 3 to 7 days.

After the reaction is completed, water is added to the reaction mixture and is concentrated. The precipitated solid portion is separated by filtration, for example. The separated solids are washed with water or hot water, treated with a dilute alkali such as caustic soda or caustic potash, then washed with water and separated, and finally dried, whereby the polystyrene based polymer containing units of structure having Formula (I), i.e., a polystyrene based polymer containing cyclodextrin derivative of this invention can be obtained.

Typical examples of the unit of structure of the polystyrene based polymer containing cyclodextrin derivatives, the novel compounds of this invention, which are produced, for example, by Procedures A or B, are units of structure represented by the formula:

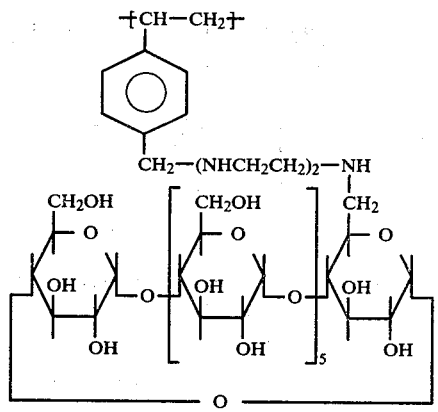

wherein 6-deoxy-6-(α-diethylenetriamino)-β-cyclodextrin is bonded, and a unit of constitution represented by the formula:

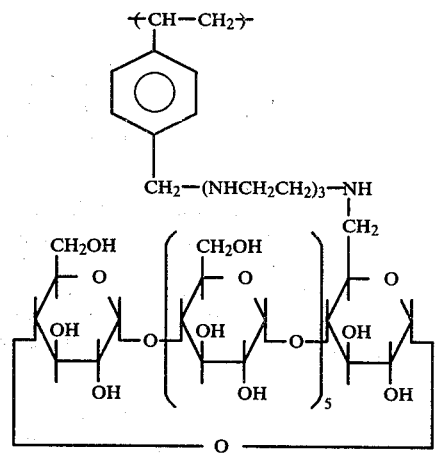

wherein 6-deoxy-6-(α-triethylenetetraamino)-β-cyclodextrin is bonded.

On bringing the above described cyclodextrin derivative-containing polystyrene based polymer in contact with an aqueous solution of a metal salt, the metal complex thereof can be obtained. Metal salts as herein used are not especially limited, and salts of copper, zinc, nickel, magnesium, manganese, cobalt, aluminum, iron and the like can be used. Preferred metal salts are copper sulfate, zinc sulfate, nickel sulfate, cobalt sulfate, manganese acetate and the like. Production of such metal complexes can be achieved by well known, simple procedures. For example, the cyclodextrin derivative-containing polystyrene based polymer is added to an aqueous solution of a metal salt and the resulting mixture is stirred. In more detail, the above polystyrene based polymer is swelled in water at a temperature ranging from between room temperature and 80° C., and is added to an aqueous solution of a metal salt (water-soluble salt such as metal sulfate, metal acetate or other) in an equimolar amount to the polyalkylenepolyamino group of the polymer. The resulting mixture is allowed to stand at from room temperature to 50° C. for 30 minutes to 5 days. On washing the reaction product with water, the desired metal complex can be obtained.

The thus obtained metal complex of cyclodextrin derivative-containing polystyrene based polymer is considered to have the structure where each nitrogen atom of the polymer is attached to a metal ion as a ligand. Therefore, the ratio of cyclodextrin derivative-containing polystyrene based polymer to metal ion in the metal complex varies widely depending upon the number of nitrogen atoms contained in the polyalkylenepolyamine group intervening between cyclodextrin and polystyrene.

The cyclodextrin derivative-containing polystyrene based polymers and their metal complexes of this invention can incorporate or capture organic material dissolved in water very effectively. Furthermore, the polymer portion of these polystyrene based polymers and their metal complexes is stable to a wide variety of solvents such as water, organic solvents and others. Thus they permit removal of water-soluble organic materials containing anionic groups from the aqueous solution thereof, and purification thereof, which have hitherto been difficult. Furthermore, utilizing the difference in incorporation ability to organic material, it is possible to effect separation of isomers or homologs.

The conditions under which the water soluble organic material is separated and removed are not especially limited. The temperature of the aqueous solution is sufficient if as high as room temperature. The pH of the aqueous solution is preferably 5 to 11.

Water-soluble organic materials which can be separated and removed by the use of the polystyrene based polymers and their metal complexes of this invention are, for example, those organic materials containing anionic functional groups and oleophilic portions. In particular, alicyclic and aromatic compounds, and others containing anionic groups such as sulfonic acid, carboxyl, phenolic, hydroxyl and like groups can be well captured. Typical examples of these organic materials are phenol, naphthol, benzoic acid, naphthoic acid, toluic acid, cresol, cyclohexane carboxylic acid, adamantane carboxylic acid, 2-oxo-1-adamantane carboxylic acid, benzenesulfonic acid, nitrophenol, naphthoylacetic acid, naphthalenesulfonic acid, 8-anilinonaphthalene-1-sulfonic acid and the like.

Moreover, since the polystyrene based polymers and their metal complexes of this invention can easily release the incorporated organic material, they can be used repeatedly.

In addition, they can be effectively used as catalysts for various reactions. Therefore, they can be effectively employed in various chemical industries such as treatment of waste water, fillers for gas chromatography, etc.

The following examples, reference examples and comparative examples are given to illustrate embodiments of this invention.

REFERENCE EXAMPLE 1

Procedure 1 for synthesis of p-chloromethylpolystyrene

A 200 ml long-necked flask was charged with 20 grams of polystyrene of an average degree of polymerization of 1700 to 1800 and 124 ml of chloromethyl methyl ether, and was stoppered. The polystyrene was dissolved in the chloromethyl methyl ether at room temperature with stirring by a magnetic stirrer. To this solution was then added 1.2 grams of powdered anhydrous zinc chloride, and the resulting mixture was stirred at room temperature for 20 hours. The chloromethyl methyl ether was distilled away from the reaction mixture under reduced pressure, and the residue was dissolved in 50 ml of chloroform. The resulting solution was added with stirring to 300 ml of methanol. The precipitated white solids were filtered and dried. The thus obtained solids were added to 100 ml of chloroform, and after stirring, the solution portion was added with stirring to 300 ml of methanol. The precipitated white solids were filtered and dried, and thus 13.5 grams of p-chloromethylpolystyrene soluble in chloroform was obtained. Analysis by proton nuclear magnetic resonance spectrum (CDCl$_3$) indicated that the degree of chloromethylation was 27.3% based upon the benzene ring of polystyrene.

REFERENCE EXAMPLE 2

Procedure 2 for synthesis of p-chloromethylpolystyrene

A 200 ml long-necked flask was charged with 20 grams of polystyrene of an average degree of polymerization of 1700 to 1800 and 124 ml of chloromethyl methyl ether, and was stoppered. The polystyrene was dissolved in the chloromethyl methyl ether at room temperature with stirring by a magnetic stirrer. To this solution was then added 2.0 grams of powdered anhydrous zinc chloride, and the resulting mixture was stirred at room temperature for 20 hours. The chloromethyl methyl ether was distilled away from the reaction mixture under reduced pressure, and the residue was dissolved in 50 ml of chloroform. The resulting solution was added with stirring to 300 ml of methanol. The precipitated white solids were filtered and dried. The thus obtained solids were added to 100 ml of chloroform, and after stirring, the solution portion was added with stirring to 300 ml of methanol. The precipitated white solids were filtered and dried, and thus 9.0 grams of p-chloromethylpolystyrene soluble in chloroform was obtained. Analysis by proton nuclear magnetic resonance spectrum (CDCl$_3$) indicated that the degree of chloromethylation was 36% based upon the benzene ring of polystyrene.

REFERENCE EXAMPLE 3

Synthesis of 6-0-(p-toluenesulfonyl)-$\beta$-cyclodextrin

In 600 ml of dry pyridine was dissolved 34.0 grams of dry $\beta$-cyclodextrin. To this solution was then added 6.86 grams of crystals of p-toluenesulfonyl chloride with stirring by a magnetic stirrer. This reaction mixture was allowed to stand at room temperature for 16 hours, and the pyridine was then distilled away under reduced pressure. The residue was recrystallized from 400 ml of water to provide 20 grams (about 70% pure) of 6-0-(p-toluenesulfonyl)-$\beta$-cyclodextrin. The impurity was mainly unreacted $\beta$-cyclodextrin. Higher purity 6-0-(p-toluenesulfonyl)-$\beta$-cyclodextrin can be obtained by repeating recrystallization from water, but such purity is not needed in the process of this invention.

REFERENCE EXAMPLE 4

Synthesis of 6-deoxy-6-($\alpha$-triethylenetetraamino)-$\beta$-cyclodextrin

In 30 ml of triethylenetetraamine was dissolved 5.0 grams of 6-0-(p-toluenesulfonyl)-$\beta$-cyclodextrin obtained in Reference Example 3. The resulting solution was heated at 60° C. for 3 hours, and the excessive amount of triethylenetetraamine was then distilled away under reduced pressure. The residue was dissolved in 2 ml of water, and the resulting solution was added dropwise with stirring to 100 ml of ethanol. The precipitated crystals were filtered, dissolved in 5 ml of water and then freeze-dried. As a result, 4.5 grams of 6-deoxy-6-(α-triethylenetetraamino)-β-cyclodextrin containing as an impurity β-cyclodextrin was obtained. (Purity about 70%)

EXAMPLE 1

To 10 ml of N,N-dimethylacetamide were added 430 milligrams of p-chloromethylpolystyrene obtained in Reference Example 1 and 2.5 grams of 6-deoxy-6-(α-triethylenetetraamino)-β-cyclodextrin obtained in Reference Example 4, and the resulting mixture was heated at 65° C. for 30 hours. To the reaction mixture was then added 50 ml of water, and solids were filtered. The solids were washed with water, 0.1 N aqueous solution of sodium hydroxide, water, and methanol, and were then dried at 70° C. under reduced pressure for 20 hours. As a result, 390 milligrams of pale yellow solid 6-deoxy-6-(α-triethylenetetraamino)-β-cyclodextrin-containing polystyrene was obtained. Analysis for oxygen (Found 13.8%) indicated that 0.28 grams ($2.5 \times 10^{-4}$ mole) of the cyclodextrin group was contained per gram of the polymer. The infrared absorption spectrum of the polymer (FIG. 1) is substantially consistent with that of the mixture of p-chloromethylpolystyrene obtained in Reference Example 1 and β-cyclodextrin (ratio 7:3 by weight).

EXAMPLE 2

In 10 ml sample tube was placed 50 milligrams of the cyclodextrin derivative-containing polystyrene (60 to 100 mesh) obtained in Example 1, and water was added thereto to swell the polystyrene. An aqueous solution containing $1.23 \times 10^{-5}$ mole of copper sulfate was then added thereto. On allowing the resulting mixture to stand overnight, the polymer turned dark blue. Furthermore, the polymer was washed with water and dipped in 5 ml of a boric acid buffer solution of pH 10.0 for 1 hour. Then 5.0 ml of a boric acid buffer solution of pH 10.0 containing 65.5 ppm of α-naphthalene acetic acid was added to the polymer and the resulting mixture was stirred with a magnetic stirrer. A change with time in the amount of α-naphthalene acetic acid remaining in water was determined by analyzing ultraviolet absorption spectrums of the above aqueous solution. The results are shown in Table 1. Assuming that the polymer solution was homogenous, the apparent equilibrium constant ($K_{app}$) of the capture was calculated from the following equation:

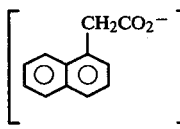

The results are shown in Table 2.

EXAMPLE 3

The procedure of Example 2 was repeated with the exception that nickel sulfate was used in place of copper sulfate. By analyzing the ultraviolet absorption spectrum of the aqueous solution which had been stirred, a change with time in the amount of α-naphthalene acetic acid remaining in water was determined. The results are shown in Table 1. Assuming that the polymer solution was homogeneous, the apparent equilibrium constant ($K_{app}$) of the capture was calculated. The results are shown in Table 2.

EXAMPLE 4

The procedure of Example 2 was repeated with the exception that no copper sulfate was added. By analyzing the ultraviolet absorption spectrum of the aqueous solution, a change with time in the amount of α-naphthalene acetic acid remaining in water was determined. The results are shown in Table 1. Assuming that the polymer solution was homogenous, the apparent equilibrium constant ($K_{app}$) of the capture was calculated. The results are shown in Table 2.

Table 1

| | | Change with time in amount of α-naphthalene acetic acid remaining in water (ppm) | | | | |
| --- | --- | --- | --- | --- | --- | --- |
| | | Time | | | | |
| Example | Metal | 10 min | 20 min | 1 hr | 6 hrs | 4 days |
| 2 | $Cu^{2+}$ | 35 | 28 | 19 | 10 | 6 |
| 3 | $Ni^{2+}$ | 41 | 31 | 17 | 8.5 | 5 |
| 4 | — | 49 | 41 | 29 | 12 | 8 |

COMPARATIVE EXAMPLE 1

After 4.0 grams of the p-chloromethylpolystyrene obtained in Reference Example 1 was dissolved in 40 ml of dry dimethylformamide, 40 ml of triethylenetetraamine was added thereto, and the resulting mixture was heated at 70° C. for 40 hours. The reaction mixture was added to 500 ml of water and the precipitated white solids were separated. These solids were washed with water, 1 N hydrochloric acid aqueous solution, water, 1 N sodium hydroxide solution and water in this order, and furthermore with methanol, and they were then dried at 70° C. under reduced pressure for 20 hours. Thus 4.3 grams of white or pale yellow p-(α-triethylenetetraamino)-methyl-polystyrene was obtained. In a 10 ml sample tube was placed 50 milligrams of the above obtained polymer (60 to 100 mesh), and water was added thereto to swell the polymer. An aqueous solution containing $70 \times 10^{-5}$ mole of copper sulfate was added thereto, and on allowing the resulting mixture to stand overnight, the polymer turned dark blue. This polymer was washed with water and dipped in 5 ml of a boric acid buffer solution of pH 10.0 for 1 hour. To this polymer was added 5.0 ml of a boric acid buffer solution of pH 10.0 containing 521 ppm of α-naphthalene acetic acid, and the resulting mixture was stirred with a magnetic stirrer. By analyzing the ultraviolet absorption spectrums of the aqueous solution, a change with time in the amount of α-naphthalene acetic acid remaining in water was determined. The results are shown in Table 3. Assuming that the polymer solution was homogeneous, the apparent equilibrium constant ($K_{app}$) of capture was calculated. The results are shown in Table 2.

COMPARATIVE EXAMPLE 2

The procedure of Comparative Example 1 was repeated with the exception that nickel sulfate was used in place of copper sulfate. By analyzing the ultraviolet absorption spectrums of the aqueous solution, a change with time in the amount of α-naphthalene acetic acid remaining in water determined. The results are shown in Table 3. Assuming that the polymer solution was homogenous, the apparent equilibrium constant ($K_{app}$) of capture was calculated. The results are shown in Table 2.

COMPARATIVE EXAMPLE 3

The procedure of Comparative Example 1 was repeated with the exception that no copper sulfate was added. By analyzing the ultraviolet absorption spectrums of the aqueous solution, a change with time in the amount of α-naphthalene acetic acid remaining in water was determined. The results are shown in Table 3. Assuming that the polymer solution was homogenous, the apparent equilibrium constant ($K_{app}$) of capture was calculated. The results are shown in Table 2.

Table 2

| | Polymers | |
|---|---|---|
| Metal | Polymer obtained in Example | p-(α-triethylenetetraamino)-methylpolystyrene |
| $Cu^{2+}$ | 1000 (1 hour) | 200 (1 hour) |
| | 5000 (4 days) | 1000 (6 days) |
| $Ni^{2+}$ | 1000 (1 hour) | 40 (1 hour) |
| | 6000 (4 days) | 370 (6 days) |
| None | 600 (1 hour) | 20 (1 hour) |
| | 3000 (4 days) | 90 (6 days) |

Table 3

| | | Change with time in amount of α-naphthalene acetic acid remaining in water (ppm) | | | | |
|---|---|---|---|---|---|---|
| Comparative | | Time | | | | |
| Example | Metal | 10 min | 20 min | 1 hr | 17 hrs | 6 days |
| 1 | $Cu^{2+}$ | 318 | 245 | 146 | 71 | 37 |
| 2 | $Ni^{2+}$ | 469 | 433 | 334 | 156 | 99 |
| 3 | — | 474 | 469 | 412 | 255 | 241 |

REFERENCE EXAMPLE 5

Synthesis of p-(α-triethylenetetraamine)-methylpolystyrene

After 4.0 grams of the p-chloromethylpolystyrene obtained in Reference Example 2 was dissolved in 40 ml of dry dimethylformamide, 40 ml of triethylenetetraamine was added thereto, and the resulting mixture was heated at 70° C. for 40 hours. The reaction mixture was added to 500 ml of water and the precipitated white solids were filtered. The thus obtained solids were washed with water, 1 N hydrochloric acid aqueous solution, water, 1 N sodium hydroxide solution, and water in this order, and furthermore with methanol, and they were then dried at 70° C. under reduced pressure for 20 hours. As a result, 3.5 grams of white or pale yellow p-(α-triethylenetetraamino)-methylpolystyrene was obtained.

EXAMPLE 5

To 15 ml of dimethylformamide were added 447 milligrams of 32 to 60 mesh portion of the p-(α-triethylenetetraamino)-methylpolystyrene obtained in Reference Example 5 and 2.8 grams of the 6-0-(p-toluenesulfonyl)-β-cyclodextrin obtained in Reference Example 3, and the resulting mixture was heated at 60° C. for 3 days. Then 50 ml of hot water was added to the reaction mixture and the solids were filtered. These solids were washed with hot water, 0.1 N sodium hydroxide aqueous solution and water, and with methanol, and they were dried at 70° C. under reduced pressure for 20 hours. As a result, 400 milligrams of 6-deoxy-6-(α-triethylenetetraamino)-β-cyclodextrin-containing polystyrene was obtained. Analysis of the thus obtained polymer by infrared absorption spectrum indicated that about $2.4 \times 10^{-4}$ mole of cyclodextrin group and about $1.4 \times 10^{-3}$ mole of triethylenetetraamino group were contained per gram of the polymer.

EXAMPLE 6

To each of 25 milligrams of the cyclodextrin-containing polystyrene obtained in Example 5, or to each of the metal complex of the cyclodextrin-containing polystyrene prepared by adding 0.5 millimole of copper, nickel aqueous solution to 25 milligrams of the polymer was added 1.0 ml of a solution containing $2.5 \times 10^{-4}$ millimole of a water-soluble organic material, and the resulting mixture was allowed to stand at 20° C. for 170 minutes. Then the amount of the water-soluble organic material remaining in water was measured by ultraviolet absorption spectrum. The results are shown in Table 4. It can be seen that in each case, the organic molecules were captured from the dilute solution. With regard to phenols, this polymer treatment permits easy reduction of the phenols to less than 5 ppm which is below the Waste Water Standard of Japan.

Table 4

| Amount of water-soluble organic material in water (ppm) | | | | | |
|---|---|---|---|---|---|
| Organic Material | | | | Metal | |
| Initial Conc. | (ppm) | pH | None | $Cu^{2+}$ | $Ni^{2+}$ |
|  | 43 | 6.9 | 6 | 2 | 4 |
|  | 43 | 6.9 | 5 | 2 | 4 |
|  | 36 | 10.0 | 3 | 2 | 2 |

EXAMPLE 7

To 25 milligrams of the cyclodextrin-containing polystyrenes obtained in Example 5 was added water to swell it, and 0.5 millimole of anhydrous copper sulfate was added thereto. On allowing the resulting mixture to stand overnight, a dark blue cyclodextrin-containing polystyrene based polymer-copper (II) complex was obtained. The resulting solution turned colorless, which is evidence that the most copper ion was complexed with the polymer.

What is claimed is:

1. A polystyrene base polymer containing cyclodextrin containing units of structure having the formula:

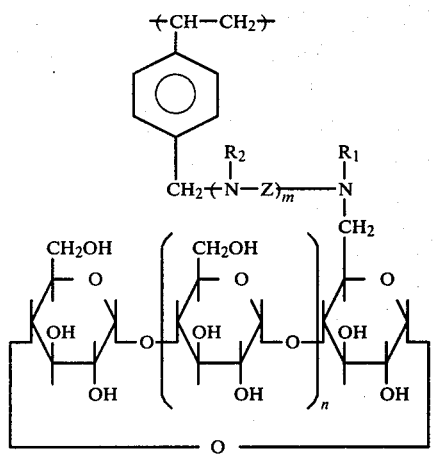

wherein m is an integer of 1 to 10; n is 4, 5 or 6; $R_1$ and $R_2$ are hydrogen or alkyl groups containing 1 to 3 carbon atoms; and Z is an alkylene group containing 1 to 5 carbon atoms.

2. A polystyrene base polymer according to claim 1, wherein said units of structure have the formula:

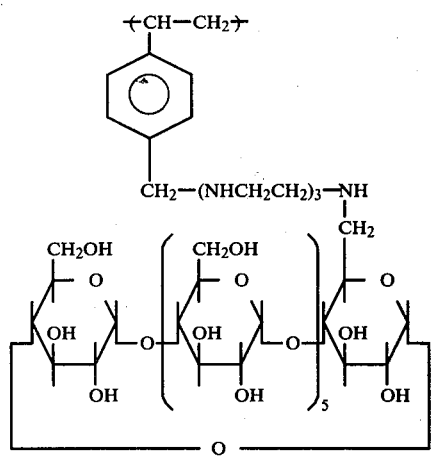

3. A polystyrene base polymer according to claim 1, wherein said units of structure have the formula:

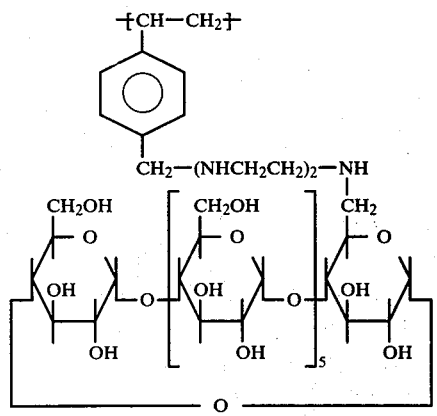

4. A polystyrene base polymer according to claim 1, wherein said cyclodextrin containing units of structure comprise between 1/10 and 8/10 of the units of structure of said polymer containing benzene rings pendant from said polymer chain.

5. A metal complex prepared by contacting a polystyrene base polymer containing units of structure having the formula:

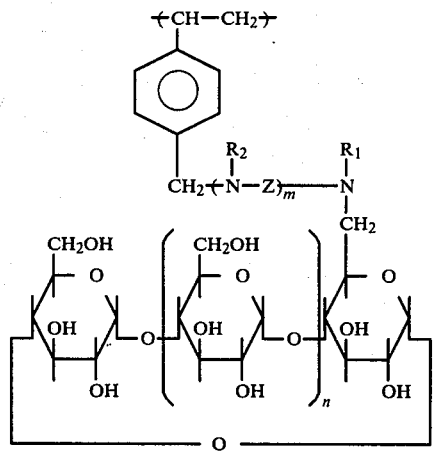

wherein m is an integer of 1 to 10; n is 4, 5 or 6; $R_1$ and $R_2$ are hydrogen or alkyl groups containing 1 to 3 carbon atoms; and Z is an alkylene group containing 1 to 5 carbon atoms with an aqueous solution of a metal salt.

6. A metal complex according to claim 5, wherein the metal is selected from the group consisting of copper, zinc, nickel, magnesium, manganese, cobalt, aluminum and iron.

7. A metal complex according to claim 5, prepared by contacting a cyclodextrin derivative-containing polystyrene base polymer containing units of structure having the formula:

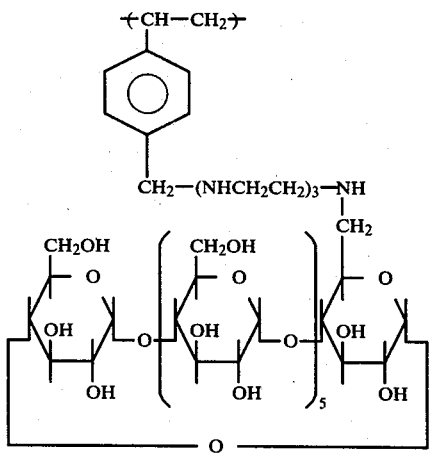

with a copper sulfate aqueous solution.

8. A metal complex according to claim 5, prepared by contacting a cyclodextrin derivative-containing polystyrene base polymer containing units of structure having the formula:

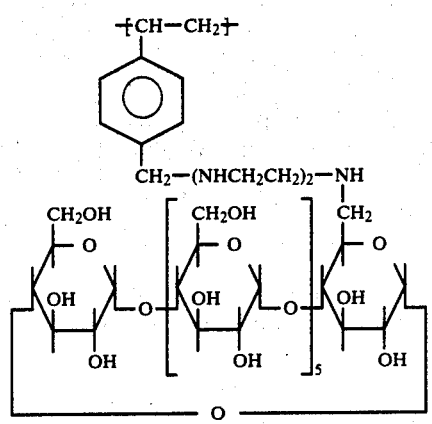

with a nickel sulfate aqueous solution.

9. A metal complex according to claim 5, prepared by contacting a cyclodextrin derivative-containing polystyrene base polymer containing units of structure having the formula:

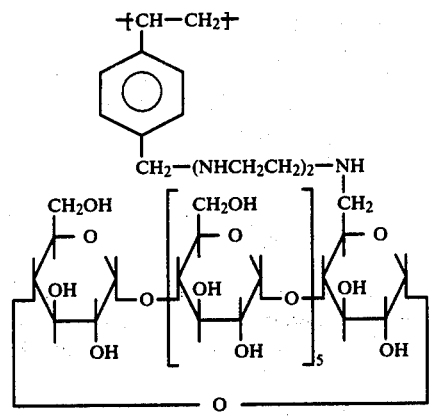

with a zinc sulfate aqueous solution.

10. A metal complex according to claim 5, prepared by contacting a cyclodextrin derivative-containing polystyrene base polymer containing units of structure having the formula:

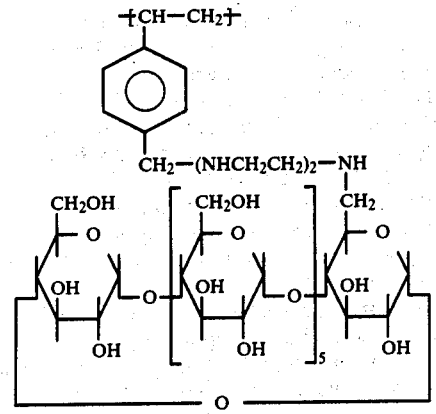

with a cobalt sulfate aqueous solution.

11. A metal complex according to claim 5, prepared by contacting a cyclodextrin derivative-containing polystyrene base polymer containing units of structure having the formula:

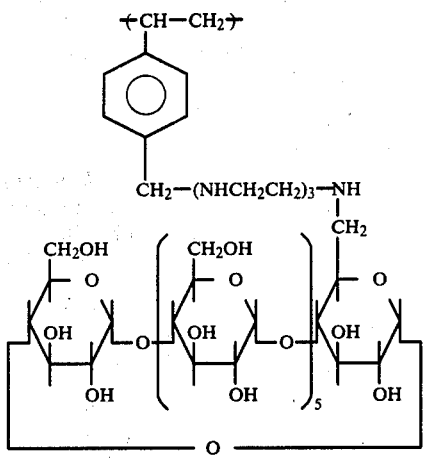

with a zinc sulfate aqueous solution.

12. A process for producing a cyclodextrin derivative-containing polystyrene base polymer containing units of structure having the formula:

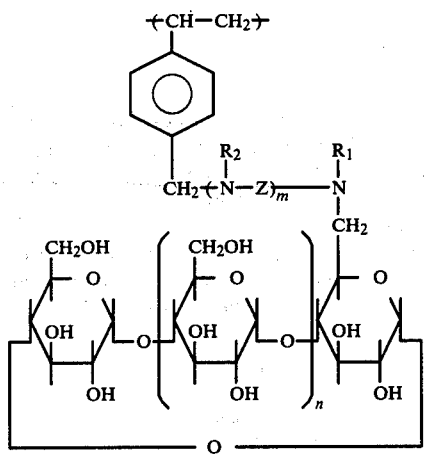

wherein m is an integer of 1 to 10; n is 4, 5 or 6; $R_1$ and $R_2$ are hydrogen or alkyl groups containing 1 to 3 carbon atoms; and Z is an alkylene group containing 1 to 5 carbon atoms, which comprises reacting a cyclodextrin derivative having the formula:

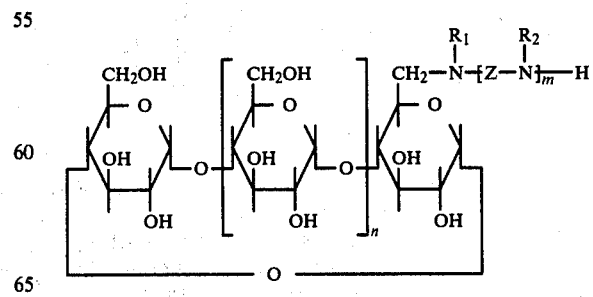

with a polystyrene base polymer containing units of structure having the formula:

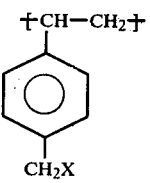

wherein X is halogen.

13. A process according to claim 12, wherein the cyclodextrin derivative is 6-deoxy-6-(α-triethylenetetraamino)-β-cyclodextrin represented by the formula:

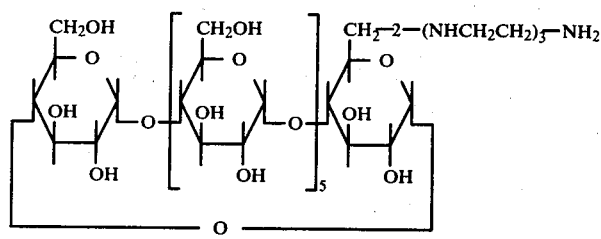

14. A process according to claim 12, wherein the ratio of halomethyl substituted benzene rings contained in the polystyrene base polymer is from 1 to 8 per 10 of the benzene rings.

15. A process for producing a cyclodextrin derivative-containing polystyrene base polymer containing units of structure having the formula:

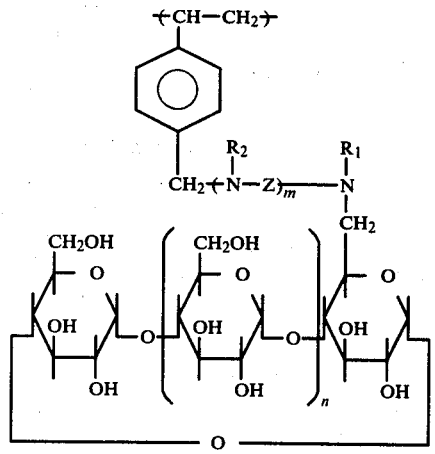

wherein m is an integer of 1 to 10; n is 4, 5 or 6; $R_1$ and $R_2$ are hydrogen or alkyl groups containing 1 to 3 carbon atoms; and Z is an alkylene group containing 1 to 5 carbon atoms, which comprises reacting a sulfonic acid ester of cyclodextrin represented by the formula:

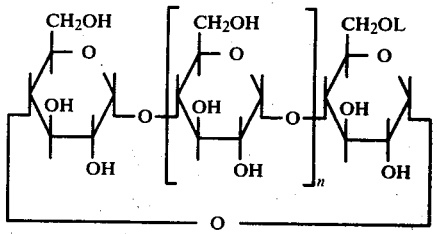

wherein L is an aromatic sulfonyl group, with a polystyrene base polymer containing units of structure having the formula:

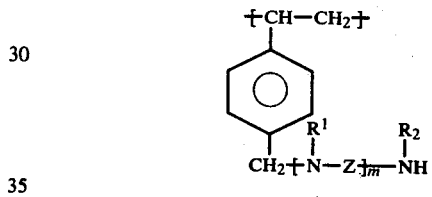

16. A process according to claim 15, wherein said polystyrene base polymer contains p-(α-triethylene-tetraamino)-methylstyrene units represented by the formula:

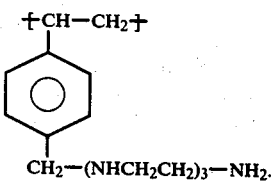

17. A process according to claim 15, wherein the aromatic sulfonyl group L of the cyclodextrin derivative is the p-toluene-sulfonyl group.

18. A process according to claim 15, wherein the ratio of the polyalkylene polyamino substituted benzene rings contained in the polystyrene base polymer is 1 to 8 per 10 of the benzene rings.

19. A polystyrene base polymer according to claim 4, wherein said cyclodextrin containing units of structure comprise between 2/10 and 5/10 of the units of structure of said polymer.

20. A polystyrene base polymer according to each of claims 1, 4 or 19, wherein said polystyrene base polymer is polystyrene consisting essentially of pendant benzene rings and said cyclodextrin containing units of structure.

* * * * *